(12) United States Patent
Zhang

(10) Patent No.: US 11,385,487 B2
(45) Date of Patent: Jul. 12, 2022

(54) DISPLAY MODULE AND GLUE DISPENSING METHOD HEREOF

(71) Applicant: WUHAN CHINA STAR OPTOELECTRONICS TECHNOLOGY CO., LTD., Wuhan (CN)

(72) Inventor: Wei Zhang, Wuhan (CN)

( * ) Notice: Subject to any disclaimer, the term of this patent is extended or adjusted under 35 U.S.C. 154(b) by 397 days.

(21) Appl. No.: 16/630,483

(22) PCT Filed: Nov. 6, 2019

(86) PCT No.: PCT/CN2019/115854
§ 371 (c)(1),
(2) Date: Jan. 13, 2020

(87) PCT Pub. No.: WO2021/056695
PCT Pub. Date: Apr. 1, 2021

(65) Prior Publication Data
US 2021/0405434 A1  Dec. 30, 2021

(30) Foreign Application Priority Data
Sep. 23, 2019 (CN) .......................... 201910901133.9

(51) Int. Cl.
G02F 1/1333 (2006.01)
G02F 1/1335 (2006.01)
H04N 5/225 (2006.01)

(52) U.S. Cl.
CPC .. *G02F 1/133354* (2021.01); *G02F 1/133512* (2013.01); *G02F 1/133528* (2013.01); *H04N 5/2257* (2013.01); *G02F 2202/28* (2013.01)

(58) Field of Classification Search
CPC ............ H04N 5/2257; G02F 1/133512; G02F 1/133528
See application file for complete search history.

(56) References Cited

U.S. PATENT DOCUMENTS

| | | | |
|---|---|---|---|
| 10,996,503 B2 * | 5/2021 | Yu | ...................... G02F 1/133514 |
| 2007/0211192 A1 | 9/2007 | Ahn | |
| 2009/0257010 A1 | 10/2009 | Sakurai | |
| 2022/0026771 A1 * | 1/2022 | Yan | .................... G02F 1/136209 |

FOREIGN PATENT DOCUMENTS

| | | | | |
|---|---|---|---|---|
| CN | 106773244 A | | 5/2017 | |
| CN | 108983468 A | * | 12/2018 | ......... G02F 1/13338 |
| CN | 109491119 A | | 3/2019 | |
| CN | 109541833 A | * | 3/2019 | ....... G02F 1/133308 |
| CN | 109597236 A | * | 4/2019 | ........... G02B 6/0088 |

(Continued)

*Primary Examiner* — Mariceli Santiago

(57) ABSTRACT

A display module and a glue dispensing method thereof are provided. The display module includes a display panel and a backlight module, and a polarizer is disposed between the display panel and the backlight module. The display module includes a blind hole for under-screen camera lighting in a display area, and the display panel includes a light transmission region and a light non-transmission region which are disposed corresponding to the blind hole. An aperture of the polarizer corresponding to the blind hole is reduced and blackened at an edge, thereby omitting the first glue dispensing process in the blind hole of the conventional structures.

11 Claims, 2 Drawing Sheets

(56) References Cited

FOREIGN PATENT DOCUMENTS

| CN | 109597236 | A | | 4/2019 | | |
|----|-----------|---|---|--------|---|---|
| CN | 208922027 | U | | 5/2019 | | |
| CN | 110136573 | A | | 8/2019 | | |
| CN | 110138935 | A | | 8/2019 | | |
| CN | 110244484 | A | | 9/2019 | | |
| CN | 110333617 | A | * | 10/2019 | ........... | G02F 1/1333 |

\* cited by examiner

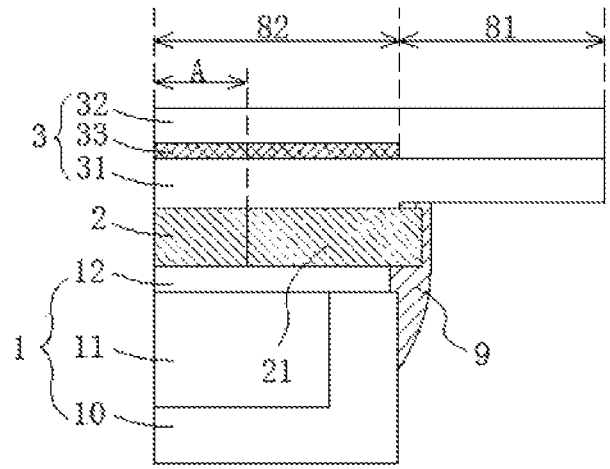

FIG. 3 adhering a polarizer to a surface of a display panel, and adhering and aligning the display panel having the polarizer to a backlight module to form a display module to be glue dispensed — S10 performing a glue dispensing process at a boundary of an opening of the blind hole, such that the glue adheres to the backlight module and a side surface of an opening of the polarizer, and contacts with the display panel — S20 curing the glue — S30

FIG. 4

DISPLAY MODULE AND GLUE DISPENSING METHOD HEREOF

BACKGROUND OF INVENTION

Field of Invention

The present invention relates to the field of display technologies, and more particularly, to a display module and a glue dispensing method thereof.

Description of Prior Art

In view of full-screen development of mobile phones, camera holes originally disposed infront of screens are moved to display areas of the screens, and light transmission regions are formed in the display areas for lighting of front cameras; that is to say, upper and lower polarizers (POLs) and backlights should be bored, and display panels should be blind hole processed. After the boring process, glue dispensing processes are usually required. One glue dispensing process is performed after the polarizer is adhered, and a region for glue dispensing is from an inner diameter of a hole of the lower polarizer to an inner diameter of a black matrix (BM) region. Subsequently, the backlights are assembled, followed by applying a second glue dispensing process to the display panels and the backlight assemblies. However, due to poor accuracy of the first glue dispensing process, light leakage will occur. The leaked light entering viewing angle areas (i.e., light transmission regions) of the cameras will affect the photographic effect of the cameras.

Therefore, it is urgent to solve the problems of the existing techniques.

SUMMARY OF INVENTION

The present invention provides a display module and a glue dispensing method thereof, which may solve the problems of the existing techniques that display modules of under-screen camera leak light due to the accuracy of one glue dispensing process in blind holes (i.e., front camera holes), in which the leaked light entering the viewing angle areas of the cameras may affect the photographic effect of the cameras.

For solving the above problems, the technical solutions of the present invention are as follows.

The present invention provides a display module, including a display panel and a backlight module which are aligned and adhered to each other, and a polarizer disposed between the display panel and the backlight module.

The display module includes a display area and a blind hole, in which the blind hole is disposed in the display area and penetrates a back of the display module.

The display panel includes a light transmission region and a light non-transmission region surrounding the light transmission region which are formed in a position corresponding the blind hole.

A boundary of an opening of the polarizer at the blind hole extends to an edge of the light transmission region, and a boundary of an opening of the backlight module at the blind hole is disposed in the light non-transmission region.

At least one part of the polarizer corresponding to the blind hole is a light-shielding portion, in which the light-shielding portion extends from the boundary of the opening of the polarizer to a side of the light non-transmission region away from the light transmission region. The light-shielding portion overlaps the light non-transmission region to form an overlap region.

In the display module of the present invention, a glue is filled with the blind hole, and the glue adheres to the backlight module and a side surface of the opening of the polarizer, and contacts with the display panel.

In the display module of the present invention, the boundary of the opening of the polarizer is disposed in the light transmission region, and a distance between the boundary of the opening of the polarizer and the edge of the light transmission region is less than or equal to a width of the glue.

In the display module of the present invention, the display module further includes a camera assembly, in which the camera assembly corresponds to the blind hole and is disposed at a side of the backlight module away from the display panel, and the camera assembly is configured to take a picture of an article at a side of the display panel away from the camera assembly.

In the display module of the present invention, a height of the glue is less than or equal to a distance between the camera assembly and the display panel, and the glue is disposed out of a photosensitive region of the camera assembly.

In the display module of the present invention, the polarizer includes a light-shielding material corresponding to a surface of the light-shielding portion, or the light-shielding portion of the polarizer is made of the light-shielding material.

In the display module of the present invention, the light-shielding portion extends from the boundary of the opening of the polarizer to the light non-transmission region and stops in the light non-transmission region, and a distance between a boundary of the light-shielding portion and the side of the light non-transmission region away from the light transmission region is more than or equal to 0.25 mm.

In the display module of the present invention, the display panel includes a black matrix corresponding to the light non-transmission region, in which the black matrix extends from a boundary of the light transmission region to a boundary of the light non-transmission region.

For solving the above problems, the present invention further provides a glue dispensing method of the above display module. The method includes the following steps:

step S10: adhering a polarizer to a surface of a display panel, and adhering and aligning the display panel having the polarizer to a backlight module to form a display module to be glue dispensed;

step S20: performing a glue dispensing process at a boundary of an opening of the blind hole, such that the glue adheres to the backlight module and a side surface of an opening of the polarizer, and contacts with the display panel; and step S30: curing the glue.

For solving the above problems, the present invention further provides a display module, including a display panel and a backlight module which are aligned and adhered to each other, and a polarizer disposed between the display panel and the backlight module.

The display module includes a display area and a blind hole, in which the blind hole is disposed in the display area and penetrates a back of the display module.

The display panel includes a light transmission region and a light non-transmission region surrounding the light transmission region which are formed in a position corresponding the blind hole.

A boundary of an opening of the polarizer at the blind hole extends to an edge of the light transmission region, and a boundary of an opening of the backlight module at the blind hole is disposed in the light non-transmission region.

At least one part of the polarizer corresponding to the blind hole is a light-shielding portion, in which the light-shielding portion extends from the boundary of the opening of the polarizer to the light non-transmission region and stops at a side of the light non-transmission region away from the light transmission region, and the light-shielding portion overlaps the light non-transmission region to form an overlap region.

In the display module of the present invention, a glue is filled with the blind hole, and the glue adheres to the backlight module and a side surface of the opening of the polarizer, and contacts with the display panel.

In the display module of the present invention, the boundary of the opening of the polarizer is disposed in the light transmission region, and a distance between the boundary of the opening of the polarizer and the edge of the light transmission region is less than or equal to a width of the glue.

In the display module of the present invention, the display module further includes a camera assembly, in which the camera assembly corresponds to the blind hole and is disposed at a side of the backlight module away from the display panel, and the camera assembly is configured to take a picture of an article at a side of the display panel away from the camera assembly.

In the display module of the present invention, a height of the glue is less than or equal to a distance between the camera assembly and the display panel, and the glue is disposed out of a photosensitive region of the camera assembly.

In the display module of the present invention, the polarizer includes a light-shielding material corresponding to a surface of the light-shielding portion, or the light-shielding portion of the polarizer is made of the light-shielding material.

In the display module of the present invention, the light-shielding portion extends from the boundary of the opening of the polarizer to the light non-transmission region and stops in the light non-transmission region, and a distance between a boundary of the light-shielding portion and the side of the light non-transmission region away from the light transmission region is more than or equal to 0.25 mm.

In the display module of the present invention, the display panel includes a black matrix corresponding to the light non-transmission region, and the black matrix extends from a boundary of the light transmission region to a boundary of the light non-transmission region.

The benefits of the present invention include that the display module and the glue dispensing method thereof provided in the present invention reduce the diameter of the opening of the lower polarizer by omitting the first glue dispensing process performed on the blind hole after the polarizer is adhered, and the edge of the aperture of the lower polarizer is printed with black ink (or blackened) for light-shielding. In comparison with the conventional processes, the present invention only needs to perform the second glue dispensing process, thereby saving one process and providing a simpler process, and solving the problem of light leakage due to poor accuracy of the first glue dispensing process.

BRIEF DESCRIPTION OF DRAWINGS

In order to more clearly illustrate the technical solutions in the embodiments, the drawings described in the description of the embodiments are briefly described below. It is obvious that the drawings in the following description are only some embodiments of the present invention. Other drawings can also be obtained from those skilled persons in the art based on drawings without any creative effort.

FIG. 3 is a partial schematic view of a structure of a blind hole of a display module provided in one embodiment of the present invention.

FIG. 4 is a process flow diagram showing a glue dispensing method of a display module provided in one embodiment of the present invention.

DETAILED DESCRIPTION OF PREFERRED EMBODIMENTS

Figure 1:
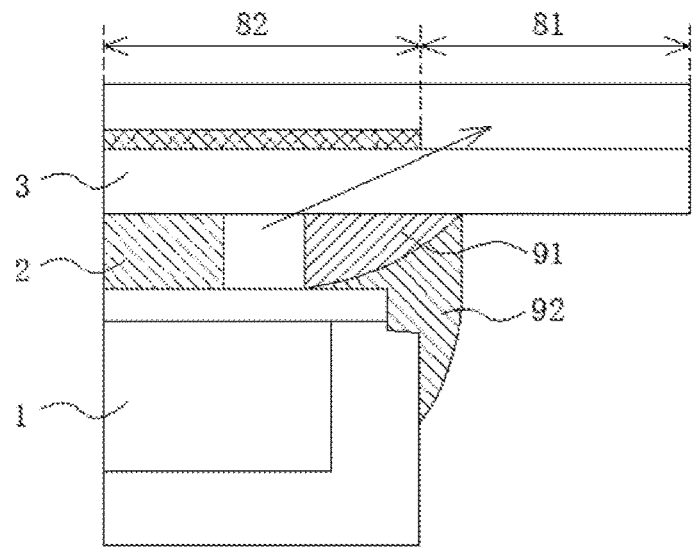
FIG. 1 is a partial schematic view of a structure of a blind hole of a display module of a conventional under-screen camera.

The embodiments are described in detail below with reference to the accompanying drawings and used for exemplifying the specific embodiments carrying out the present invention. Directional terms mentioned in this application, such as "up", "down", "forward", "backward", "left", "right", "inside", "outside", "side", etc., are merely indicated the direction of the drawings. Therefore, the directional terms are used for illustrating and understanding of the application rather than limiting thereof. In the drawings, the components having similar structures are marked with the same reference numerals.

Referring to FIG. 1, a partial schematic view of a structure of a blind hole of a display module of a conventional under-screen camera is shown. In the structure of the conventional display module, a display panel 3 needs to make a blind hole in a display area, in which the blind hole includes a light transmission region 81 and a light non-transmission region 82 surrounding the light transmission region 81. Further, a polarizer and a backlight module 1 need to be bored at a position corresponding to the blind hole. Usually, after the polarizer is adhered, a first glue dispensing process needs to be performed in a region between a boundary of an opening of a lower polarizer 2 and a boundary of the light non-transmission region 82. However, because of poor accuracy of the first glue dispensing process, a first glue 91 is skewed, resulting in a gap between the first glue 91 and the boundary of the opening of the lower polarizer 2. Afterward, the display panel 3 and the backlight module 1 are assembled, followed by a second glue dispensing process. Since a second glue 92 is formed at an outside of the first glue 91, the defect of the first glue dispensing process that light leakage will occur in the gap cannot be remedied. The leaked light entering the viewing angle area (i.e., the light transmission region 81) of the camera will affect the photographic effect of the camera. The light leakage is shown by the arrow in FIG. 1.

As to the problem that light leakage occurs in the blind hole (i.e., the front camera hole) of the display modules of the conventional under-screen cameras due to the accuracy of the first glue dispensing process, in which the leaked light entering the viewing angle area of the camera may affect the photographic effect of the camera, the embodiments of the present invention can solve such defect.

Figure 2:
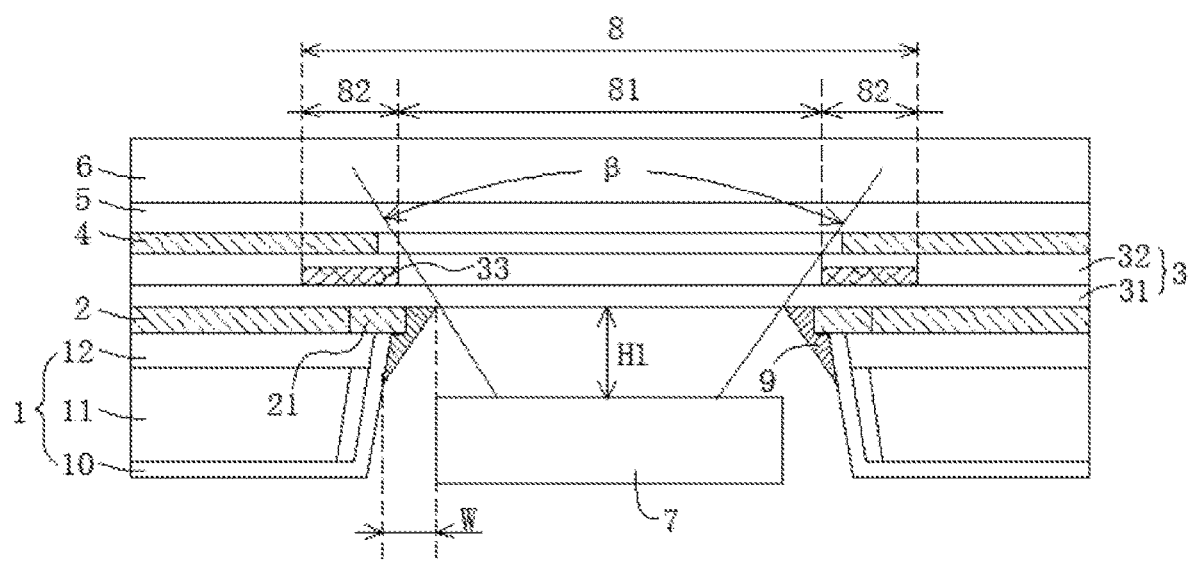
FIG. 2 is a schematic view of a structure of a display module provided in one embodiment of the present invention.

Referring to FIG. 2, a schematic view of a structure of a display module provided in one embodiment of the present invention is shown. The display module includes a display panel 3 and a backlight module 1, which are aligned and adhered to each other. A lower polarizer 2 is adhered to the display panel 3 and the backlight module 1, and an upper polarizer 4 is adhered to the other side surface of the display panel 3. A cover 6 is adhered to the upper polarizer 4 by an optical adhesive 5. The display module includes a display area and a blind hole 8, in which the blind hole 8 is disposed in the display area and penetrates a back of the display module. The display panel 3 includes a light transmission region 81 and a light non-transmission region 82 surrounding the light transmission region 81, which are formed in a position corresponding the blind hole 8. The display module further includes a camera assembly 7, in which the camera assembly 7 corresponds the blind hole 8 and is disposed at a side of the backlight module 1 away from the display panel 3, and the camera assembly 7 is configured to take a picture of an article at a side of the display panel 3 away from the camera assembly 7. The camera assembly 7 performs lighting by the light transmission region 81.

In this embodiment, a shape of the blind hole 8 is circular, and the light non-transmission region 82 is a ring shape surrounding the light transmission region 81, but they are not limited thereto. In other embodiments, the shape of the blind hole 8 may be oval, drop-shaped, U-shaped, rectangular, or other irregular shape.

The display panel 3 of the present invention may be a liquid crystal display panel or an organic light-emitting diode (OLED) display panel. In this embodiment, a liquid crystal display panel is taken as an example for description. The display panel 3 includes an array substrate 31, a color filter substrate 32, and a liquid crystal layer (not shown) disposed between the array substrate 31 and the color filter substrate 32. The array substrate 31 includes a signal trace arranged at a position corresponding to the light non-transmission region 82. The display panel 3 includes a black matrix 33 disposed above the signal trace, in which the black matrix 33 is used for light-shielding and extends from a boundary of the light transmission region 81 to a boundary of the light non-transmission region 82.

The upper polarizer 4, the lower polarizer 2, and the backlight module 1 are all bored at a position where the blind hole 8 is disposed. The boundaries of the openings of the upper polarizer 4 and the backlight module 1 are disposed in the light non-transmission region 82. Specifically, the boundaries of the openings of the upper polarizer 4 and the backlight module 1 may be disposed in any position in the light non-transmission region 82, which are not limited herein.

The boundary of the opening of the lower polarizer 2 is disposed in the boundary of the light transmission region 81, or the boundary of the opening of the lower polarizer 2 extends to the edge of the light transmission region 81, and goes beyond a preset distance from the boundary of the light transmission region 81.

At least one part of the lower polarizer 2 corresponding to the blind hole 8 is a light-shielding portion 21, in which the shape of the light-shielding portion 21 is a ring shape, and the light-shielding portion 21 extends from the boundary of the opening of the lower polarizer 2 to a side of the light non-transmission region 82 away from the light transmission region 81, provided that the light-shielding portion 21 does not go beyond the boundary of the side of the light non-transmission region 82 away from the light transmission region 81. The light-shielding portion 21 overlaps the light non-transmission region 82 to form an overlap region.

The backlight module 1 includes, but is not limited to, a backsheet 10, and a light source plate 11 and an optical film 12 which are disposed in the backsheet 10.

A glue 9 is filled with the blind hole 8, in which the glue 9 adheres to the backlight module 1 and the surrounding of the side surface of the opening of the lower polarizer 2, and contacts with the display panel 3. The glue 9 is disposed out of a photosensitive region β (i.e., a region covering the viewing angle area of the camera) of the camera assembly 7, and a height of the glue 9 is less than or equal to a distance H1 between the camera assembly 7 and the display panel 3.

In this embodiment, the boundary of the opening of the lower polarizer 2 is disposed in the light transmission region 81, and a distance between the boundary of the opening of the lower polarizer 2 and the edge of the light transmission region 81 is less than or equal to a width W of the glue 9.

The lower polarizer 2 includes a light-shielding material corresponding to a surface of the light-shielding portion 21, and the light-shielding material includes, but is not limited to, black ink for printing. In another embodiment, the light-shielding material and the black matrix 33 may be the same material, or the light-shielding portion 21 of the lower polarizer 2 is made of light-shielding material.

The present invention reduces the diameter of the opening of the lower polarizer 2 by omitting the first glue dispensing process performed on the blind hole 8 after the polarizer is adhered, and the edge of the aperture of the lower polarizer 2 is printed with black ink (or blackened) for light-shielding. In comparison with the conventional processes, the present invention only needs to perform the second glue dispensing process, thereby saving one process and providing a simpler process. In the present invention, the combination of the black matrix 33 and the light-shielding portion 21 of the lower polarizer 2 may completely block the light emitted from the light source of the light source plate 11 and directed toward the viewing angle area β of the camera, thereby solving the problem of light leakage due to poor accuracy of the first glue dispensing process.

In addition, since the light-shielding portion 21 goes beyond the boundary of the light transmission region 81, but does not go beyond the width W of the glue 9, it may further ensure that the light from the light source plate 11 will not enter the viewing angle area β of the camera, thereby ensuring the photographic performance of the camera assembly 7.

Referring to FIG. 3, a partial schematic view of a structure of a blind hole of a display module provided in one embodiment of the present invention is shown. In this embodiment, the light-shielding portion 21 extends from the boundary of the opening of the lower polarizer 2 to the light non-transmission region 82 and stops in the light non-transmission region 82, and a distance A between the boundary of the light-shielding portion 21 and the side of the light non-transmission region 82 away from the light transmission region 81 is greater than or equal to 0.25 mm. The light emitted from the light source plate 11 corresponding to the light non-transmission region 82 may illuminate the display area surrounding the blind hole 8, thereby ensuring that the brightness of a part of the display area surrounding the blind hole 8 and the rest of the display area is uniform, and improving the display effect of the display area.

In one embodiment, the light-shielding portion 21 extends from the boundary of the opening of the lower polarizer 2 to the light non-transmission region 82 and stops at a side of the light non-transmission region 82 away from the light transmission region 81.

The light-shielding portion 21 of the lower polarizer 2 of the present invention overlaps the black matrix 33 to form an overlap region. The overlap width of the overlap region may ensure that the light passing through the light-shielding portion 21 and the black matrix 33 may be completely blocked by the black matrix 33.

The present invention further provides a glue dispensing method of the above display module. Referring to FIGS. 2 and 4, the steps included in the method are as follows.

Step S10 is adhering a polarizer to a surface of a display panel 3, and adhering and aligning the display panel 3 having the polarizer to a backlight module 1 to form a display module to be glue dispensed;

wherein the display panel 3 includes a blind hole 8 disposed in a display area, the blind hole 8 includes a light transmission region 81 and a light non-transmission region 82, the upper and lower surfaces of the display panel 3 are adhered to a upper polarizer 4 and a lower polarizer 2, respectively, and the upper polarizer 4 and the lower polarizer 2 are bored. The boundary of the opening of the upper polarizer 4 is disposed in the light non-transmission region 82, and the boundary of the opening of the lower polarizer 2 is disposed at the edge of the light transmission region 81.

Afterwards, the edge of the opening of the lower polarizer 2 is blackened; for example, the edge of the opening of the lower polarizer 2 is printed with black ink or coated with a light-shielding material, such that a light-shielding portion 21 is formed at the edge of the opening of the lower polarizer 2. The light-shielding portion 21 does not go beyond a boundary of a side of the light non-transmission region 82 away from the light transmission region 81.

By the present invention, the alignment and adhesion of a backlight module 1 may be directly performed after a polarizer is adhered, without performing a glue dispensing process. Further, the backlight module 1 is also bored at a position corresponding to the blind hole 8. The boundary of the opening of the backlight module 1 is disposed in the light non-transmission region 82.

Step S20 is performing a glue dispensing process at the boundary of the opening of the blind hole 8, such that the glue 9 adheres to the backlight module 1 and a side surface of the opening of the lower polarizer 2, and contacts with the display panel 3.

That is to say, in the present invention, the glue dispensing process is only performed after the backlight assembly is completed. The light-shielding portion 21 does not go beyond the glue dispensing range (width) of the glue 9.

Step S30 is curing the glue 9.

In comparison with the conventional processes, the present invention omits the first glue dispensing process after the polarizer is adhered; specifically, in the present invention, the second glue dispensing process of the conventional processes is directly performed after the backlight assembly is completed, thereby saving one process. In addition, the present invention reduces the opening of the lower polarizer 2 and blackens it to form a light-shielding portion 21, thereby effectively solving the problem of light leakage due to poor accuracy of the first glue dispensing process.

From the above, although the present invention has been disclosed by the preferred embodiments as above, the preferred embodiments should not be considered as limitations to the present invention. Those skilled persons in the art may change and modify the present invention without departing from the spirit and scope of the present invention. Hence, the scope of the present invention is determined by claims.

What is claimed is:

1. A display module, comprising a display panel and a backlight module which are aligned and adhered to each other, and a polarizer disposed between the display panel and the backlight module;

wherein the display module comprises a display area and a blind hole, and the blind hole is disposed in the display area and penetrates a back of the display module;

wherein the display panel comprises a light transmission region and a light non-transmission region surrounding the light transmission region, which are formed in a position corresponding to the blind hole;

wherein a boundary of an opening of the polarizer at the blind hole extends to an edge of the light transmission region, and a boundary of an opening of the backlight module at the blind hole is disposed in the light non-transmission region;

wherein at least one part of the polarizer corresponding to the blind hole is a light-shielding portion, the light-shielding portion extends from the boundary of the opening of the polarizer to a side of the light non-transmission region away from the light transmission region, and the light-shielding portion overlaps the light non-transmission region to form an overlap region;

wherein the blind hole is filled with a glue, and the glue adheres to the backlight module and a side surface of the opening of the polarizer, and contacts with the display panel;

wherein the display module further comprises a camera assembly, the camera assembly corresponds to the blind hole and is disposed at a side of the backlight module away from the display panel, and the camera assembly is configured to take a picture of an article at a side of the display panel away from the camera assembly; and wherein a height of the glue is less than or equal to a distance between the camera assembly and the display panel, and the glue is disposed outside of a photosensitive region of the camera assembly.

2. The display module according to claim 1, wherein the boundary of the opening of the polarizer is disposed in the light transmission region, and a distance between the boundary of the opening of the polarizer and the edge of the light transmission region is less than or equal to a width of the glue.

3. The display module according to claim 1, wherein the polarizer comprises a light-shielding material corresponding to a surface of the light-shielding portion, or the light-shielding portion of the polarizer is made of the light-shielding material.

4. The display module according to claim 1, wherein the light-shielding portion extends from the boundary of the opening of the polarizer to the light non-transmission region and stops in the light non-transmission region, and a distance between a boundary of the light-shielding portion and the side of the light non-transmission region away from the light transmission region is greater than or equal to 0.25 mm.

5. The display module according to claim 1, wherein the display panel comprises a black matrix corresponding to the light non-transmission region, and the black matrix extends from a boundary of the light transmission region to a boundary of the light non-transmission region.

6. A glue dispensing method of the display module according to claim 1, comprising:

step S10: adhering the polarizer to a surface of the display panel, and adhering and aligning the display panel having the polarizer to the backlight module to form the display module to be glue dispensed;

step S20: performing a glue dispensing process at a boundary of an opening of the blind hole, such that the glue adheres to the backlight module and a side surface of an opening of the polarizer, and contacts with the display panel; and step S30: curing the glue.

7. A display module, comprising a display panel and a backlight module which are aligned and adhered to each other, and a polarizer disposed between the display panel and the backlight module;

wherein the display module comprises a display area and a blind hole, and the blind hole is disposed in the display area and penetrates a back of the display module;

wherein the display panel comprises a light transmission region and a light non-transmission region surrounding the light transmission region, which are formed in a position corresponding to the blind hole;

wherein a boundary of an opening of the polarizer at the blind hole extends to an edge of the light transmission region, and a boundary of an opening of the backlight module at the blind hole is disposed in the light non-transmission region;

wherein at least one part of the polarizer corresponding to the blind hole is a light-shielding portion, the light-shielding portion extends from the boundary of the opening of the polarizer to the light non-transmission region and stops at a side of the light non-transmission region away from the light transmission region, and the light-shielding portion overlaps the light non-transmission region to form an overlap region;

wherein the blind hole is filled with a glue, and the glue adheres to the backlight module and a side surface of the opening of the polarizer, and contacts with the display panel;

wherein the display module further comprises a camera assembly, the camera assembly corresponds to the blind hole and is disposed at a side of the backlight module away from the display panel, and the camera assembly is configured to take a picture of an article at a side of the display panel away from the camera assembly; and wherein a height of the glue is less than or equal to a distance between the camera assembly and the display panel, and the glue is disposed outside of a photosensitive region of the camera assembly.

8. The display module according to claim 7, wherein the boundary of the opening of the polarizer is disposed in the light transmission region, and a distance between the boundary of the opening of the polarizer and the edge of the light transmission region is less than or equal to a width of the glue.

9. The display module according to claim 7, wherein the polarizer comprises a light-shielding material corresponding to a surface of the light-shielding portion, or the light-shielding portion of the polarizer is made of the light-shielding material.

10. The display module according to claim 7, wherein the light-shielding portion extends from the boundary of the opening of the polarizer to the light non-transmission region and stops in the light non-transmission region, and a distance between a boundary of the light-shielding portion and the side of the light non-transmission region away from the light transmission region is greater than or equal to 0.25 mm.

11. The display module according to claim 7, wherein the display panel comprises a black matrix corresponding to the light non-transmission region, and the black matrix extends from a boundary of the light transmission region to a boundary of the light non-transmission region.

* * * * *